7158X
T. B. Reynolds,
Bench Plane.
Patented July 7. 1832.
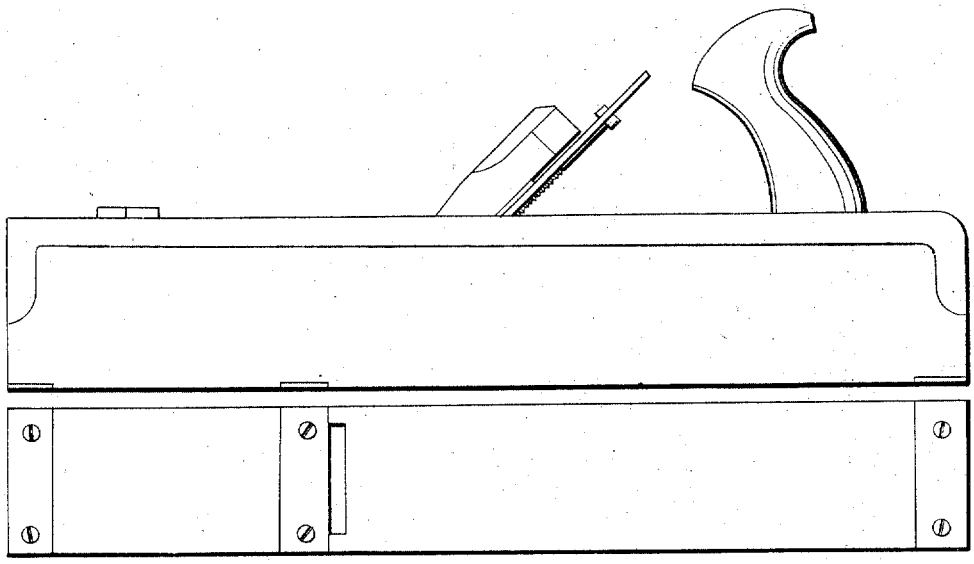
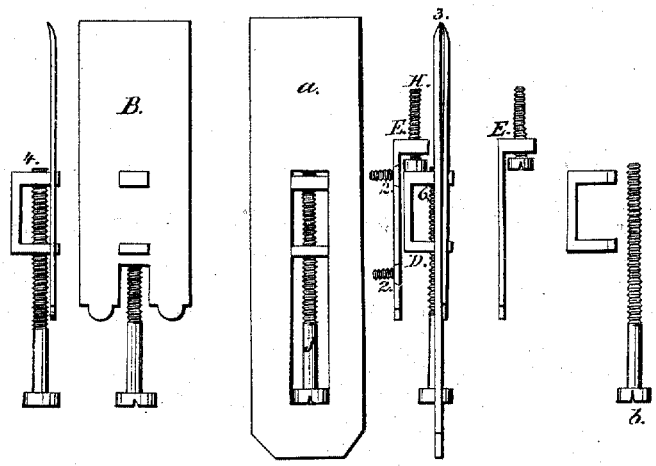
N. PETERS, PHOTO-LITHOGRAPHER, WASHINGTON, D. C.

71587 16 July 7, 1832 377

Wm B. Reynolds of [illegible] State of Ohio.

Letters Patent.

The schedule referred to in these Letters Patent and making part of the same
containing a description in the words of the said William B. Reynolds himself of
his improvement in the Double Iron Trying Planes.

To all to whom these presents shall come.
Be it known that I William B. Reynolds of the Town of St Clairsville in the
County of Belmont and State of Ohio, have invented a new and useful improve
ment in the double Iron trying Planes which I have gave my improvement the
name of double iron double geared set screw, and that the following is a full and
exact description of the construction of the said plane, as invented and improved
by me. With reference to the draught by figures and letters. a. is the iron [illegible]
which lay in the back of the mouth of the plane which contains the slit mortise about
five eights wide and four inches long, which mortise starts at the upper edge of the
steel f. is the screw that lays in the mortise which regulates the cap iron, B. is the cap
plate that lays on the iron that contains the slit mortise, which is made out of a fine
of rolled steel about one eighth of an inch thick, bevilled off at the lower end, and fit
close to the lower end of the cutting part of the bit that contains the slit mortise,
and sets screw which the cap is regulated by the screw, f. which is a side view
the screw f is inserted through a piece the form of a staple D. the width of the slit
mortise in plate a. the length of the staple each part that the screw is inserted is about
one inch and three fourths apart, the lower part is a strong screw cut to insert the screw
through for the cap to move up and down, to regulate the cap to the edge of the cutting part,
of the plate a, the staple is let up through the cap plate with a square mortise
which may be fastened by two taps or may be rivited to answer the same, C is the
guard that is let in the back of the mouth of the plane behind the iron that con-
tains the slit mortise, it is made in the form of a square with a screw let
through the lower end about one inch long one fifth thick with a head about three
eighths of an inch diameter with a [illegible] and in to turn with a screw driving to
[illegible] against the lower part of the staple D. which is fastened through the cap [illegible]
[illegible]

778 71587

B. which it stops the bit when placed in the plane from setting too deep, B. is the screw in the guard C, about a fourth thick one inch long, head about three eighths diameter with a notch cut in a screw driver to turn with up or down to act as a guard against the lower end of the staple D. that is fastened to the cap plate B. for the purpose of regulating the depth of the set of the bit when the plane is in use, the guard C, is about five eighths, and one fourth thick, three inches and onefourth long at the lower end where the screw is let through, is about three eighths thick, for the purpose of strength. it is let into the back of the mouth of the plane, about three fourths deep exactly in the center of the mouth, and secured fast by two wood screws, F. 2. the set screw, it is made exactly the length of the slit mortice about one fourth thick, with a thick strong head three eighths diameter, with a notch to receive the screw driver to regulate the cap. The thread is cut up from the point about two inches and a half, and slipped through a smooth hole in the upper part of the staple D. to the lower end at F. 6, which a strong thread is cut through to receive the screw by turning it the cap moves up and down to regulate the set, of cap plate when placed together, F 3. is a side view of the cap plate bit and [illegible] together in the plane ready for work F 4 is a side view of cap plate staple and set screw to show the plan they are united together. June the 2d 1832, Witness Wilson Shannon
R. E. Carothers
Sterling Johnston William B. Reynolds.

768 n [illegible]

E. [illegible]

Chd W.

(Patented 7 July 1832)